United States Patent
Van Den Enden et al.

(10) Patent No.: US 6,628,583 B1
(45) Date of Patent: Sep. 30, 2003

(54) METHOD AND DEVICE FOR RECORDING INFORMATION IN LINKING BLOCK UNITS

(75) Inventors: Gijsbert Joseph J. Van Den Enden, Veldhoven (NL); Johannes H. M. Spruit, Eindhoven (NL); Ronald R. Drenten, Eindhoven (NL); Jacobus M. Eradus, Eindhoven (NL); Johannes J. L. M. Van Vlerken, Eindhoven (NL); Robert A. Brondijk, Eindhoven (NL); Pope Ijtsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/601,754

(22) PCT Filed: Dec. 6, 1999

(86) PCT No.: PCT/EP99/09608

§ 371 (c)(1),
(2), (4) Date: Aug. 7, 2000

(87) PCT Pub. No.: WO00/34952

PCT Pub. Date: Jun. 15, 2000

(30) Foreign Application Priority Data

Dec. 9, 1998 (EP) .............................................. 98204167
Apr. 16, 1999 (EP) .............................................. 99201186

(51) Int. Cl.⁷ ................................................ G11B 7/00
(52) U.S. Cl. .................. 369/47.1; 369/47.13; 369/47.27
(58) Field of Search ........................... 369/47.13, 275.3, 369/47.28, 47.19, 47.48, 47.1, 47.27

(56) References Cited

U.S. PATENT DOCUMENTS 5,187,699 A    2/1993   Raaymakers et al. ......... 369/48
6,252,838 B1 * 6/2001   Kuroda et al. ........... 369/47.28

FOREIGN PATENT DOCUMENTS

WO    WO9816014    4/1998

* cited by examiner

Primary Examiner—Nabil Hindi
(74) Attorney, Agent, or Firm—Russell Gross

(57) ABSTRACT

A method and device for recording information signals on a partly recorded writable record carrier (11), e.g. an optical disc. An information signal represents at least one information unit. The record carrier has a recording track which comprises preformed track position information indicative of locations for recording the information units. From the information signal a modulated signal is generated having successive frames, each frame including a synchronizing signal. The modulated signal is recorded at a one of said locations, while maintaining a fixed relationship between the track position information and the synchronizing signals. In the event that the location is after and adjacent to an already recorded location, the recording is started at a link position (31) before the end of a last frame of the earlier recorded information signal at a predefined distance before a first synchronizing signal (30) of the modulated signal.

13 Claims, 4 Drawing Sheets

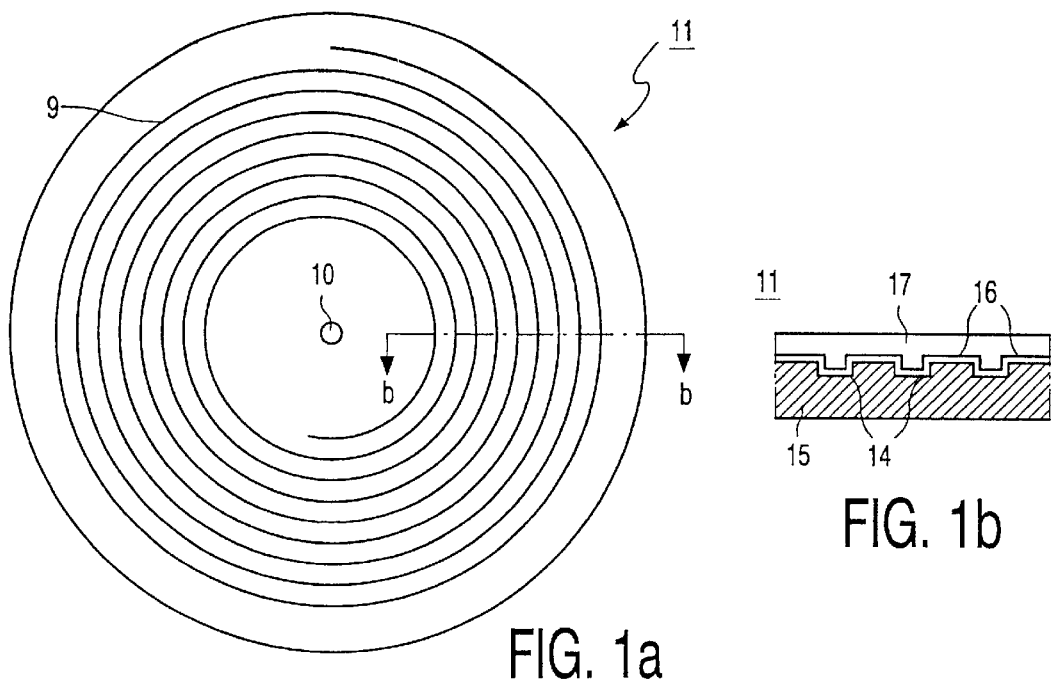
FIG. 1a
FIG. 1b
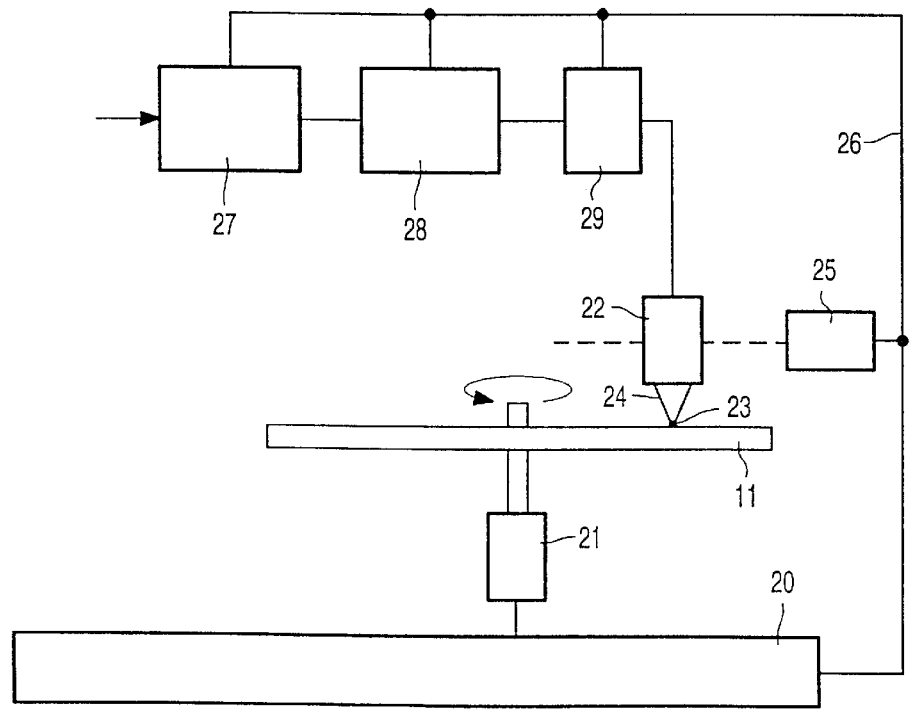
FIG. 2

METHOD AND DEVICE FOR RECORDING INFORMATION IN LINKING BLOCK UNITS

BACKGROUND OF THE INVENTION

1. Technical Field

The invention relates to a method of recording an information signal representing at least one information unit on a record carrier having a recording track which comprises preformed track position information indicative of predefined locations for consecutively recording the information units and a first one of said locations comprising an earlier recorded information signal, said method comprising: generating from the information signal a modulated signal having successive frames, each frame including a synchronizing signal, and scanning said recording track and recording the modulated signal at a second one of said locations, while controlling such recording so as to maintain a fixed relationship between the track position information and the synchronizing signals.

2. Related Art

The invention further relates to a device for recording an information signal representing at least one information unit on a record carrier having a recording track which comprises preformed track position information indicative of predefined locations for consecutively recording the information units and a first one of said locations comprising an earlier recorded information signal, the device comprising modulation means for generating from the information signal a modulated signal having successive frames, each frame including a synchronizing signal, and recording means for scanning said recording track and recording the modulated signal at a second one of said locations, and for maintaining during said recording a fixed relationship between the track position information and the synchronizing signals.

A method and apparatus for successively recording information signals on a record carrier is known from U.S. Pat. No. 5,187,699. The information signal is modulated to a modulated signal having a frame structure comprising synchronizing signals for positioning the modulated signal in the track at predefined locations indicated by prerecorded track position information. The process of consecutively recording signals in adjacent areas in a track on the record carrier is called linking. In the known linking method, after a first recording signal is completely recorded, the recording process is continued after the last frame of the modulated signal up to a link position. When a next information signal is to be recorded, the recording process is started at the link position by recording dummy information (usually zero data) up to the start of the following predefined location. Hence the signal prior to the first frame synchronizing signal of said following location does not contain valid information. As a result a so called linking block is created between the first recorded signal and the second recorded signal, which linking block includes said link position. Hence the linking block does not contain valid recorded information, and its data storage capacity is lost.

SUMMARY OF THE INVENTION

It is an object of the invention to provide a recording method and device in which linking is more efficient.

For this purpose, the method as described in the opening paragraph is characterized in that in the event that the second one of said locations is after and adjacent to the first one of said locations, the recording is started before the end of a last frame of the earlier recorded information signal at a first predefined distance before a first synchronizing signal of the modulated signal. Further the device as described in the opening paragraph is characterized in that the recording means are arranged for determining if the second one of said locations is after and adjacent to the first one of said locations, and in such event starting the recording before the end of a last frame of the earlier recorded information signal at a first predefined distance before a first synchronizing signal of the modulated signal. By starting the recording within the last part of the earlier recorded signal, the signal in the next, adjacent area, i.e. said second location, is positioned at the nominal position and includes completely the first synchronizing signal as required by decoding circuits to decode the new data recorded at the second location. Hence the modulated signal at the second location is completely decodable. In fact the link position is located within the existing recorded information, and consequently the modulated signal at the first location is damaged in the very last part. Although this causes a few errors in the last symbols of the earlier recorded information unit, this proves to be preferable to losing an entire linking block. When the errors are unacceptable to the system, a system of error protection is applied to correct said errors. The measures according to the invention have the advantage, that no linking block is created and no storage capacity is lost, because the second location comprising the last recorded signal is directly adjacent to the first location comprising the previously existing signal. In addition any recorded data stream is not interrupted by invalid data from the linking block, which provides better compatibility with existing read-only record carriers, e.g. DVD-ROM or DVD-VIDEO.

The invention is also based on the following recognition. Usual channel coding and decoding systems are arranged to operate on symbols (e.g. 8 or 16 channel bits). When during decoding a read signal from the link position is decoded, the decoder will be confronted with a shift of the symbol boundary, a so called bit slip of a few bits, because it is in practice hardly possible to start the recording process with an accuracy of less than one bit. As a result the decoder will detect errors in all symbols for the full remaining part of the frame up to the next synchronizing signal. In prior art systems this posed no problem, as the linking block did not contain useful data. However the inventors have seen, that by selecting the linking point in the last part of the existing frame only a few errors would arise, which further may be correctable by modern error correcting codes.

A first embodiment of the device has the advantage, in the event that a new recording is to be made before and adjacent to an existing one, that the first synchronizing signal of the existing recording is not damaged, and only a predictable and low number of errors is generated when decoding the last recorded signal.

A second embodiment of the device has the advantage, that the physical starting point of recording is varied. This has the effect that disturbing read signal values are prevented, while the data is not shifted from its actual position.

A third embodiment of the device has the advantage that, by using variable random data instead of a fixed pattern in said interval, the sign of the synchronizing signal is also randomly varied for subsequent overwrite cycles of the same location. Hence material defects in the recording layer of said location due to repeated writing of the same patterns are counteracted.

Further advantageous embodiments according to the invention are given in the further dependent claims.

BRIEF DESCRIPTION OF THE DRAWINGS

These and other aspects of the invention will be apparent from and elucidated further with reference to the embodiments described by way of example in the following description and with reference to the accompanying drawings, in which FIG. 1 shows a record carrier, FIG. 2 shows a recording device.

DETAILED DESCRIPTION OF THE INVENTION

Figure 3:
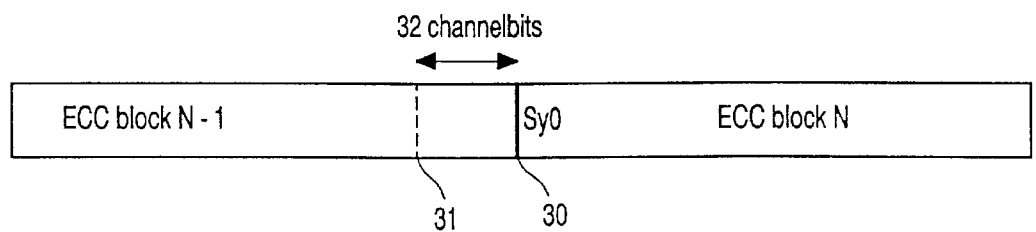
FIG. 3 shows the link position due to recording block N after block N−1.

Corresponding elements in different Figures have identical reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW. The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called blocks. The position information may include specific synchronizing marks for locating the start of such units.

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier 11 is intended for carrying information represented by modulated signals comprising frames. A frame is a predefined amount of data preceded by a synchronizing signal. Usually such frames also comprise error correction codes, e.g. parity words. An example of such a recording system is known from the DVD system, in which the frames carry 172 data words and 10 parity words, which example is used in the description below. The data is organized in units comprising a number of frames which contain Error Correction Codes (ECC) for correcting errors in the user information in the unit. In DVD the size of such a unit is 32 KB user data, and contains 2 layers of error correction, and is called a block. The first layer of error correction (called C1) corrects small errors like random errors, and the second layer (called C2) corrects the large error such as burst errors. A drive should be able to write and/or rewrite such a block independently. According to the invention no blocks are used for linking only, all blocks are used to store user data. This means that a link position should be defined in order to guarantee data integrity. There will always be some errors on a link position but the goal is to minimize the amount of errors on such a link position. The following items are important for the choice of the link position: The accuracy of the writing (in channel bits) which can be achieved with respect to the data already written on the disc.

The effect of a few bit errors on the error correction.

The content of the data written on the link position.

The physical damage caused by overwriting each time the same data.

A main consideration is, that if a bitslip occurs in combination with data, which is protected with error correction, then the position of the bitslip is very important. For DVD the data is divided in to ECC units of 32 KB, while the error correction operates on channel words or bytes. If (e.g. after the linking point) the word boundary is shifted one or a few bits, all words are different, and no error correction can take place. This is called bitslip. A C1 code word means one row of the error correction and is able to detect and correct errors. A bitslip at the beginning of a C1 code word will destroy all the bytes after the bitslip. The error correction capability is limited and the result is that the whole C1 code word is not correctable. Now the second layer (C2) is required to correct the errors. When the bitslip occurs at the end of a C1 code word then the amount of errors is limited and the error correction will be able to correct the errors. The second layer of error correction is not required for the correction of errors and can be used for other errors. So a link position is preferable position at the end of the last C1 code word of the previous ECC unit.

FIG. 3 shows the link position due to recording block N after block N−1. The link position 31 is indicated by a dashed line at 32 channel bits before the synchronizing signal 30, in the DVD format called Sy0. For DVD the first error correction layer consists of 172 data bytes and 10 parity bytes. With 10 parity bytes maximum 5 byte errors can be corrected, but a more practical limit is less or equal to 4 byte errors. The result of this insight is to position the linking of ECC block N−1 and ECC block N after the last 4 bytes of ECC block N−1 and before the start of block N. The position shown at 32 channel bits corresponds to 2 bytes (as one byte has 16 channel bits in DVD), which gives the maximum tolerance for link position inaccuracies. In general the link position may be selected as close as possible before the synchronization signal, while making sure that despite the start of write link position inaccuracies in forward direction the new information always overwrites the old synchronization signal. Correspondingly, at the end of write before an already existing information unit, the new information should never damage the next synchronization signal of said already existing information unit. The last channel words of an information unit usually represent parity symbols (called parity bytes above), and hence the minimal number of parity symbols is damaged. In an embodiment the linking errors can be limited to errors within one symbol, when the expected link position inaccuracies in forward and backward direction are limited to within one channel word. The link position is then set within the last channel word before the synchronizing signal, taking into account the maximal forward and backward inaccuracies. A practical value for such a link position is the middle of the last channel word, when a symmetrical pattern of forward and backward link position inaccuracies is expected. For a channel word of 16 channel bits this amounts to 8 channel bits before the end of the information unit.

FIG. 2 shows a recording device for writing information on a record carrier 11 of a type which is (re)writable. The device is provided with recording means for scanning the track on the record carrier including drive means 21 for rotating the record carrier 11, a head 22, positioning means 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal coupled to said tracking and focusing actuators. The read signal is processed by a reading means of a usual type (not shown) to retrieve the information. The device comprises means for processing the input information to generate a write signal to drive the head 22, which comprise an input unit 27, a formatting unit 28, and a modulation unit 29. The control unit 20 controls the recording and retrieving of information and may be arranged for receiving commands from a user or from a host computer. The control unit 20 is connected via control lines 26, e.g. a system bus, to said means and to the drive means 21, and the positioning means 25. The control unit 20 comprises control circuitry, for example a microprocessor, a program memory and control gates, for performing the procedures and functions according to the invention as described below with reference to FIG. 3. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User information is presented on the input unit 27, which may comprise of compression means for input signals such as analog audio and/or video, or digital uncompressed audio/video. Suitable compression means are described for audio in WO 98/16014-A1 (PHN 16452) and for video in the MPEG2 standard. The input unit 27 processes the audio and/or video to unit of information, which are passed to the formatting unit 28 for adding control data and formatting the data according to the recording format, e.g. by adding error correction codes (ECC). For computer applications units of information may be interfaced to the formatting unit 28 directly. The formatted data from the output of the formatting unit 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. Usually the recording apparatus will also be arranged for reading having the reading and decoding means of a playback apparatus and a combined write/read head.

According to the invention the control unit 20 of the recording device as shown in FIG. 2 is arranged for recording the information according to the methods described below with reference to the FIGS. 4 to 7. The modes of writing are defined for different situations. The start/stop or continuous writing modes are defined separately; four different writing modes are defined: Continuous writing, Start of writing when the previous location is already written, Start of writing when the previous location is erased or not written, and End of writing.

Figure 4:
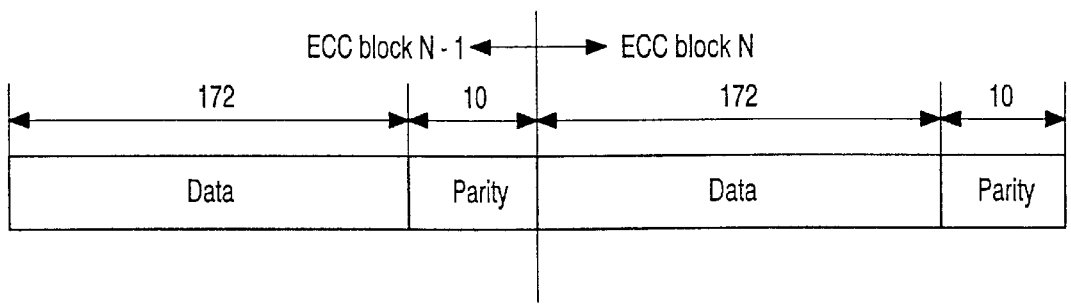
FIG. 4 shows consecutive frames for continuous recording

FIG. 4 shows consecutive frames for continuous recording. No special action is required. The recorder continually records from block N−1 to block N without special action.

Figure 5:
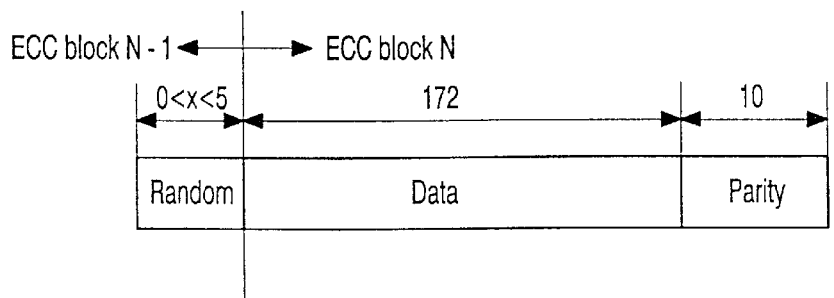
FIG. 5 shows the link position for recording block N after a recorded location.

FIG. 5 shows the link position for recording block N after a recorded location. The link position is selected at a predefined distance before the first synchronizing signal of the new frame. The predefined distance is relatively short (at least in the second half of the frame), but actually much closer to the end, so as to minimize the number of errors. For recording DVD the link position may be positioned after byte 178 of the last C1 code word of the previous ECC unit and before the start of the next ECC unit, i.e. the synchronizing signal Sy0. In an embodiment the data to be written before the new data start is chosen random, which is important for the interaction between old and new data for phase change recording. Writing each time exactly the same data over each other limits the amount of overwrite cycles. Therefore the following measures separate or in combination may be included:

The data in the linking area can be chosen random. This will prevent overwriting each time the same data in the linking area. An advantage of using random data is important when the new ECC unit contains always exactly the same data. The random data will cause always of different start value of the Digital Sum Value (DSV) at the beginning of the new ECC unit. The different values of the DSV cause differences in the following signal even when the data is not changed, and this improves the number of overwrite cycles of the data.

A small random shift of the link position can be introduced to improve the direct overwrite cycles.

In FIG. 5 a distance x in error symbols (0<x<5) is indicated for the linking distance. As discussed above the distance x must be shorter than the number of error symbols which can be corrected. Of course the actual distance may have any value in channel bits, which results in said number of correctable symbols, as long as the spread in this distance due to linking inaccuracies does not damage the next synchronization signal Sy0. It may be acceptable that in some cases even the beginning of the Sy0 synchronizing pattern is damaged, as long as the special mark (or marks) within the synchronizing pattern, e.g. a long mark I14 of runlength 14 channel bits, is not damaged, because such special marks are used for detecting the synchronizing patterns.

Figure 6:
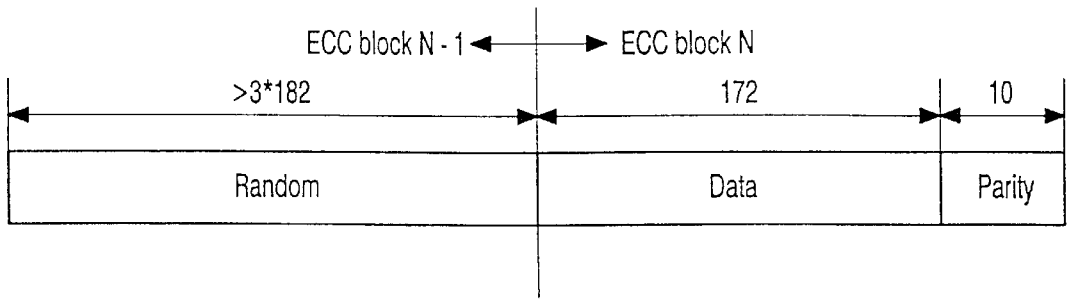
FIG. 6 shows the start position for recording block N after an unrecorded location.

FIG. 6 shows the start position for recording block N after an unrecorded location. When no data is written on the disc at the position of the previous ECC block then the recording should start at least a few hundred channel bits before the new ECC block starts. But the longer the better because the channel electronics (e.g. a PLUSlicer/Sync detection) needs time to adjust and synchronize. When at least 3 three sync frames are recorded then the flywheel construction of the sync is already working. In this case random data is written, but the sync patterns are of course embedded in the proper positions. In a practical embodiment a full information unit (e.g. a full ECC block) is added as dummy unit. The dummy unit may for example be filled with random data, or may be just repeating the data of recording block N. Adding the dummy unit does not require extra settings or dedicated formatting rules in the formatting unit 28, but only additional steps in the control unit 20 for starting the writing process one information unit earlier in the event that the recording block N is after an unrecorded area. The status of the area N−1 before area N may be known from disc control data, e.g. a table of recorded and unrecorded areas on the disc, or detected by the device just before the writing of area N. Such disc control data may be generated, stored and updated by the device itself, or by a software disc operating system in controlling computer system. In an embodiment the writing of the dummy unit on position N−1 may be started at a further predefined and different link position, e.g. at a relatively short distance after the synchronization signal of unit N−1. Thereby damage inflicted upon a unit (possibly) already recorded in position N−2 is prevented. For example the device moves the head to the beginning of position N−1 and starts reading. If no earlier recorded signal is detected, the recording of dummy unit is started at some distance after the start of the area N31 1. However, if an earlier recorded signal is detected, the reading operation is continued up to said predefined distance before the end of area N−1 and the writing is started there, i.e. at the predefined distance before the synchronization signal of the next frame, which is the first frame of block N.

Figure 7:
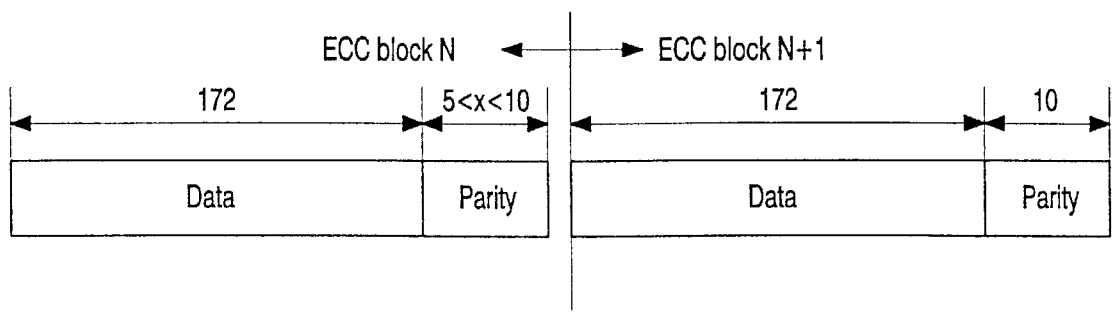
FIG. 7 shows the end position for recording block N before a recorded location.

FIG. 7 shows the end position for recording block N before a recorded location. The end of writing is preferable as short as possible before the position of the next ECC block, because then the error correction has the minimum number of errors to correct. The remaining number of undamaged parity symbols x is indicated to be between 5 and 10 for example for DVD, indicating that at least half the available number is undamaged.

Figure 8A:
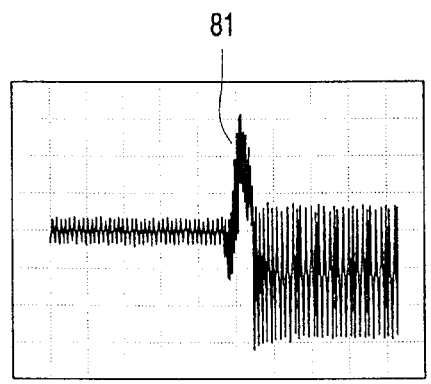
FIG. 8a shows read signal effects of overwriting at a fixed position.
Figure 8B:
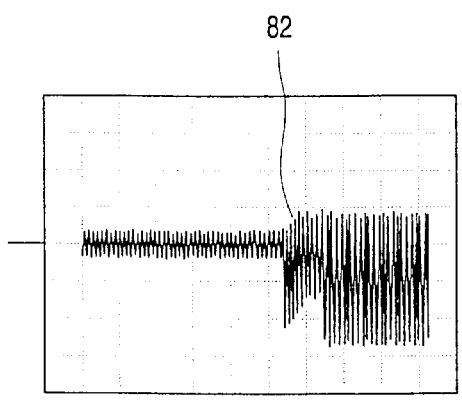
FIG. 8b shows read signal effects of overwriting at a changing position.

FIG. 8a shows read signal effects 81 of overwriting at a fixed position, while FIG. 8b shows read signal effects 82 of overwriting at a changing position. The read signal is affected by the exact position of the linking in repeated overwriting. For rewritable optical discs the phase change material is very often used to record the data. A known phenomena in phase change recording is material flow. When the start of a recording in phase change material always starts at the same position (within a few channel bits) then large fluctuations in the signal level will occur after many overwrite cycles, as shown in FIG. 8A. This is not a desired situation. Some improvement can be achieved by shifting the data randomly more than a few channel bits. But now the idea is not to start at the same position each time but randomly vary this start position of the recording, while the physical position of the data in the next frame is not altered. Hence the synchronizing signal is located at its nominal position. For example: The first recording starts at byte number 180 of the last C1 code word of the previous ECC unit and will write 2 bytes before the first C1 code word of the next ECC unit starts. The second recording (at that same location) starts at byte number 178 of the last C1 code word of the previous ECC unit and writes 4 bytes before the first C1 code word of the next ECC unit starts. The result is a variable start position of the recording while the position of the further data is not changed. The random variation may be selected to have any number of channel bits. The maximum and minimum distance should result in an amount of errors within the error correction capability. A practical implementation is a random selection between a minimum and a maximum distance.

Figure 9:
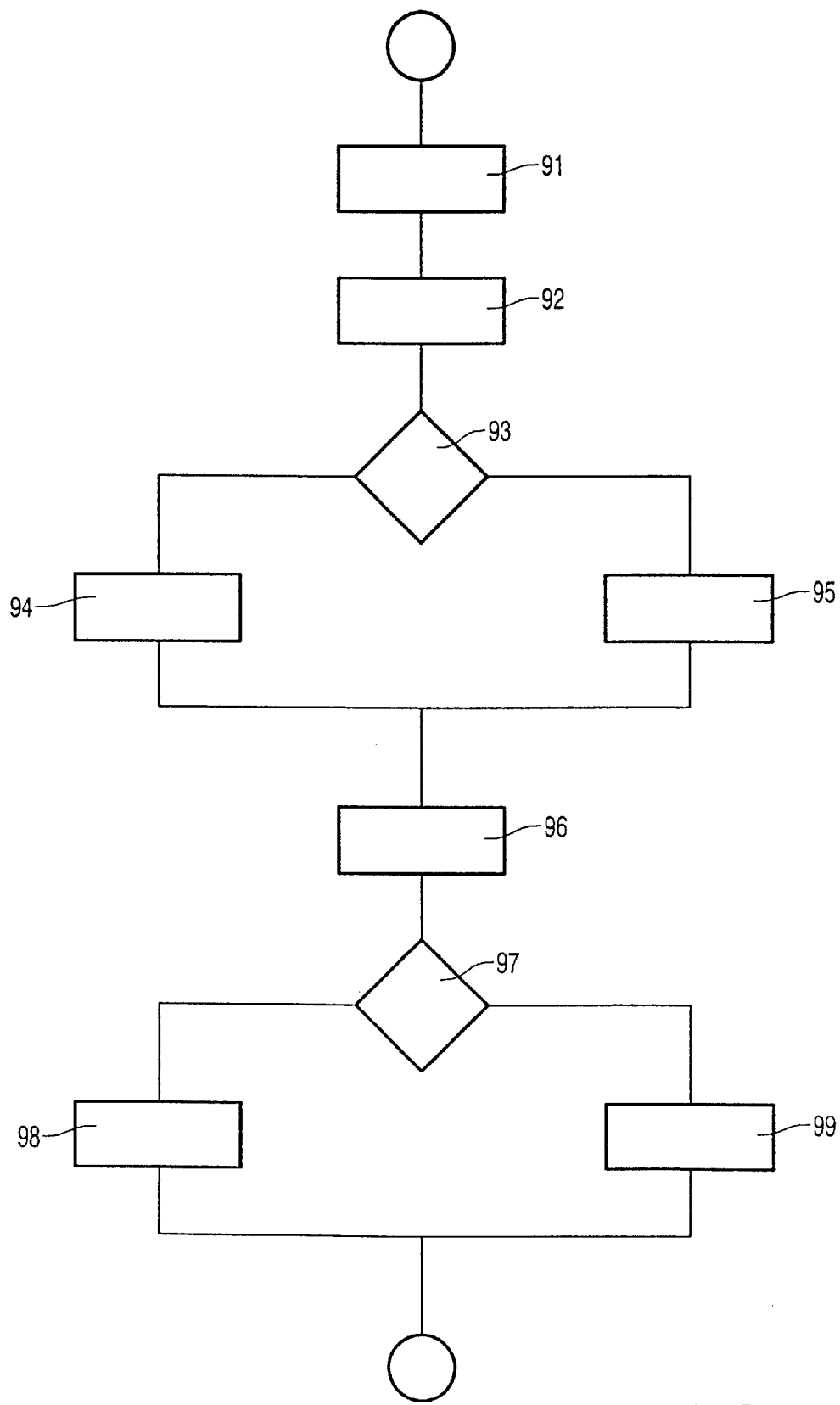
FIG. 9 shows a recording method for successively recording information signals.

FIG. 9 shows a recording method for successively recording information signals. It is assumed that a record carrier of a writable type is inserted in a recording device and that it already contains some recorded information. In a first step 91 (COMMAND) a command is received to record block N. In a second step 92 (SCAN) the track on the record carrier is scanned up to the preceding location of block N−1. In a first test 93 it is decided, if the preceding location is not blank (i.e. contains already some information signal). If NOT BLANK, in a step 95 a start position is determined at a first predetermined distance as described above with reference to FIG. 5. If no information signal is present on the preceding location, in a step 94 a long sequence of dummy data is recorded before the start of location N to enable any read circuit to lock to the data as described with reference to FIG. 6. In step 96 after said steps 94 or 95 the actual block N (or several continuous blocks as described with reference to FIG. 4) are recorded. In test 97 the status of the location N+1 after block N is determined. This may be accomplished by scanning the track before the recording is started, e.g. in step 92. Alternatively a special table may be present on the record carrier or in the device which keeps track of unrecorded and recorded areas, e.g. in the file management system. In the event that no signal is recorded after block N (or the signal has no valid status, e.g. erased), in a step the recording process is continued at least until the modulated signal of block N is completely recorded, and it may be continued for some predetermined distance after the last frame to prevent any read circuit from detecting a read error prematurely. In the event that the next location N+1 contains a valid information signal, in a step 99 the recording process is stopped at a second predetermined distance before the modulated signal of block N is completely recorded as described with reference to FIG. 7. After steps 98 or 99 the recording of block N is completed, and a next command may be awaited.

In an embodiment the test 97 is omitted and the recording process is always stopped at a short predetermined distance before the nominal position of the start of the synchronizing signal of the next block. In addition the above embodiments may be arranged to select the second predetermined distance always shorter than the first predetermined distance. This has the advantageous effect, that no unrecorded gaps will exist between successively recorded blocks. It is to be noted that starting and ending point inaccuracies must be taken into account.

Although the invention has been explained by embodiments using the DVD optical recording format, it may be applied for any format for recording units of information. For example the record carrier may also be a magnetic type disc or a tape. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

What is claimed is:

1. A method of recording a later-recorded an information signal representing at least one later-recorded information unit on a record carrier, said record carrier having a recording track which comprises preformed track position information indicative of predefined locations for consecutively recording the later-recorded information units, and a first one of said locations comprising an earlier recorded information signal, said method comprising:
   (a) generating from the later-recorded information signal a modulated signal having successive frames, each frame including a synchronizing signal;
   (b) scanning said recording track and recording the modulated signal at a second one of said locations, while controlling such recording so as to maintain a fixed relationship between the track position information and the synchronizing signals; and
   (c) wherein, in the event that the second one of said locations is after and adjacent to the first one of said locations, the recording of the later-recorded information signal is started before the end of a last frame of the earlier recorded information signal at a first predefined distance before a first synchronizing signal of the modulated signal, and wherein said later-recorded information signal consists of signal data which is not a synchronizing signal.

2. Method as claimed in claim 1, wherein the recording is terminated before the modulated signal is completely recorded at a second predefined distance before a nominal position of a first synchronizing signal of a later-recorded a information signal at the subsequent one of said locations.

3. A device for recording a later-recorded an information signal representing at least one later-recorded information unit on a record carrier having a recording track which comprises preformed track position information indicative of predefined locations for consecutively recording the later-recorded information units and a first one of said locations comprising an earlier recorded information signal, the device comprising modulation means for generating from the after-recorded information signal a modulated signal having successive frames, each frame including a synchronizing signal, and recorded means for scanning said recording track and recording the modulated signal at a second one of said locations, and for maintaining during said recording a fixed relationship between the track position information and the synchronizing signal, characterized in that the recording means are arranged for determining if the second one of said locations is after and adjacent to the first one of said locations, and in such event starting the recording of the new information before the end of a last frame of the earlier recorded information signal at a first predefined distance before a first synchronizing signal of the modulated signal, and wherein said later-recorded information signal consists of signal data which is not a synchronizing signal.

4. Device as claimed in claim 3, wherein the recording means are arranged for terminating the recording before the modulated signal is completely recorded at a second predefined distance before a nominal position of a first synchronizing signal of a later-recorded an information signal at the subsequent one of said locations.

5. Device as claimed in claim 3, wherein the device comprises error coding means for including error codes in the modulated signal, and said first or second predefined distance is smaller then a distance over which error are correctable on the basis of the error codes.

6. Device as claimed in claim 5, wherein the error coding means are arranged for including at least two layers of error codes, and said first or second predefined distance is smaller than a distance over which error are correctable on the basis of the error codes of the first layer.

7. Device as claimed in claim 5, wherein the modulated signal comprises channel words representing the error codes and the later-recorded information signal, and said first or second predefined distance substantially corresponds to half the length of a channel word.

8. Device as claimed in claim 4, wherein the second predefined distance is smaller than the first predefined distance.

9. A device for recoding an information signal representing at least one information unit on record carrier having a recording track which comprises preformed track position information indicative of predefined locations for consecutively recording the information unit and a first one of said locations comprising an earlier recorded information signal, the device comprising:
   modulation means for generating from the information signal a modulated signal having successive frames, including a synchronizing signal; and
   recording for scanning said recording track and recording the modulated signal at a second one of said location, and for maintaining during said recording a fixed relationship between the track position information and the synchronizing signal, and wherein the recording means are arranged for:
      determining if the second one of said locations is after and adjacent to the first one of said locations, and, in such event, starting the recording before the end of a frame of the earlier recorded information signal at a first predefined distance before a first synchronizing signal of the modulated signal, and
      variably selecting the predefined distance between a minimum and a maximum value, while maintaining the position of the first synchronizing signal.

10. A device for recording an information signal representing at least one information unit on a record carrier a recording track which comprises preformed track position information indicative of predefined locations for consecutively recording the information unit and a first one of said locations comprising an earlier recorded information signal, the device comprising:
   modulation means for generating from the information signal a modulated signal having successive frames, each frame including a synchronizing signal; and
   recording means for scanning said recording track and recording the modulated signal at a second one of said locations, and for maintaining during said recording a fixed relationship between the track position information and the synchronizing signal, and wherein the recording means are arranged for:

determining if the second one of said locations is after and adjacent to the first one of said locations, and in such event staring the recording before the end of a frame of the earlier recorded information signal at a first predefined distance before a first synchronizing signal of the modulated signal, and recording variable random in the interval between the predetermined distance and the first synchronizing signal.

11. A device for recording an information signal representing at least one information unit on a record carrier having a recording track which comprises preformed track position information indicative of predefined locations for consecutively recording the information unit and a first one of said locations comprising an earlier recorded information signal, the device comprising:

modulation means for generating from the information signal a modulated signal having successive frames, each frame including a synchronizing signal, and recording means for scanning said recording track and recording the modulated signal at a second one of said locations, and for maintaining during said recording a fixed relationship between the track position information and the synchronizing signals, wherein the recording means are arranged for:

determining if the second one of said locations is after and adjacent to the first one of said locations, and in such event starting the recording the recording before the end of a last frame of the earlier recorded information signal at a first predefined distance before a first synchronizing signal of the modulated signal, and event that the second one of said locations is after and adjacent to an unrecorded area, starting the recording at a third predefined distance substantially larger the first predefined distance.

12. Device as claimed in claim 11, wherein the third predefined distance is substantially equal to the length of an information unit.

13. Device as claimed in claim 3, wherein the device comprises means for processing digital or analog input signal such as and/or video to unit of information.

* * * * *